(12) United States Patent
Nishimura et al.

(10) Patent No.: US 11,952,115 B2
(45) Date of Patent: Apr. 9, 2024

(54) SERVER APPARATUS, SYSTEM, FLIGHT VEHICLE, AND OPERATION METHOD FOR SYSTEM

(71) Applicant: TOYOTA JIDOSHA KABUSHIKI KAISHA, Toyota (JP)

(72) Inventors: Kazuya Nishimura, Anjo (JP); Shin Sakurada, Toyota (JP); Soutaro Kaneko, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 118 days.

(21) Appl. No.: 17/698,555

(22) Filed: Mar. 18, 2022

(65) Prior Publication Data

US 2022/0315221 A1 Oct. 6, 2022

(30) Foreign Application Priority Data

Mar. 30, 2021 (JP) ................. 2021-058450

(51) Int. Cl.
*B64D 1/22* (2006.01)
*B64C 39/02* (2023.01)
*B64D 3/02* (2006.01)
*G05D 1/00* (2006.01)
*B64U 101/60* (2023.01)

(52) U.S. Cl.
CPC .............. *B64C 39/024* (2013.01); *B64D 1/22* (2013.01); *B64D 3/02* (2013.01); *G05D 1/0027* (2013.01); *G05D 1/0094* (2013.01); *B64U 2101/60* (2023.01); *B64U 2201/20* (2023.01)

(58) Field of Classification Search
None
See application file for complete search history.

(56) References Cited

U.S. PATENT DOCUMENTS 9,561,852 B1 * 2/2017 Beaman ................. B64C 37/02
10,514,690 B1 * 12/2019 Siegel ................. G05D 1/0225
10,593,216 B2 * 3/2020 Chow .................. B64C 39/024
(Continued)

FOREIGN PATENT DOCUMENTS

CN 108901360 A * 11/2018 ............. A01D 46/30
CN 109460059 A * 3/2019
(Continued)

*Primary Examiner* — Redhwan K Mawari
*Assistant Examiner* — Kai Nmn Wang
(74) *Attorney, Agent, or Firm* — Oliff PLC

(57) ABSTRACT

A server apparatus includes a communication unit, and a control unit configured to send an instruction for causing flight vehicles to perform a flight operation, to the flight vehicles. The flight operation includes energizing, by a first flight vehicle, a penetration tool toward a target object in a space, holding a first part, penetrated through the target object, and a second part, not penetrated through the target object, of a cord-shaped member attached to the penetration tool, and flying to outside the space, waiting, by a second flight vehicle, outside the space and receiving any one of the first and second parts from the first flight vehicle, and towing, by the first and second flight vehicles, the target object with the cord-shaped member and transporting the target object to outside the space by flying while respectively holding any one and the other of the first and second parts.

20 Claims, 11 Drawing Sheets

(56) References Cited

U.S. PATENT DOCUMENTS

| | | | | |
|---|---|---|---|---|
| 11,481,720 | B2* | 10/2022 | Abeywardena | G08G 5/025 |
| 2016/0376031 | A1* | 12/2016 | Michalski | G08G 5/0013 |
| | | | | 701/15 |
| 2017/0069214 | A1* | 3/2017 | Dupray | G08G 5/0008 |
| 2019/0171208 | A1* | 6/2019 | Magalhães de Matos | |
| | | | | G05D 1/0022 |
| 2019/0392371 | A1* | 12/2019 | Kline | G06Q 10/083 |
| 2020/0167722 | A1* | 5/2020 | Goldberg | G08G 5/0013 |
| 2021/0099522 | A1* | 4/2021 | Chiocco | H04L 69/18 |
| 2021/0318682 | A1* | 10/2021 | Hanson | B63B 1/042 |
| 2023/0192294 | A1* | 6/2023 | McCullough | B64U 50/19 |
| | | | | 244/7 R |

FOREIGN PATENT DOCUMENTS

| | | | | |
|---|---|---|---|---|
| CN | 111487997 | A * | 8/2020 | G05D 1/104 |
| CN | 110579969 | B * | 9/2022 | G05B 13/042 |
| JP | 2018-203056 | A | 12/2018 | |
| JP | 2020051176 | A * | 4/2020 | |
| WO | WO-2017120620 | A1 * | 7/2017 | |
| WO | WO-2019146580 | A1 * | 8/2019 | |

* cited by examiner

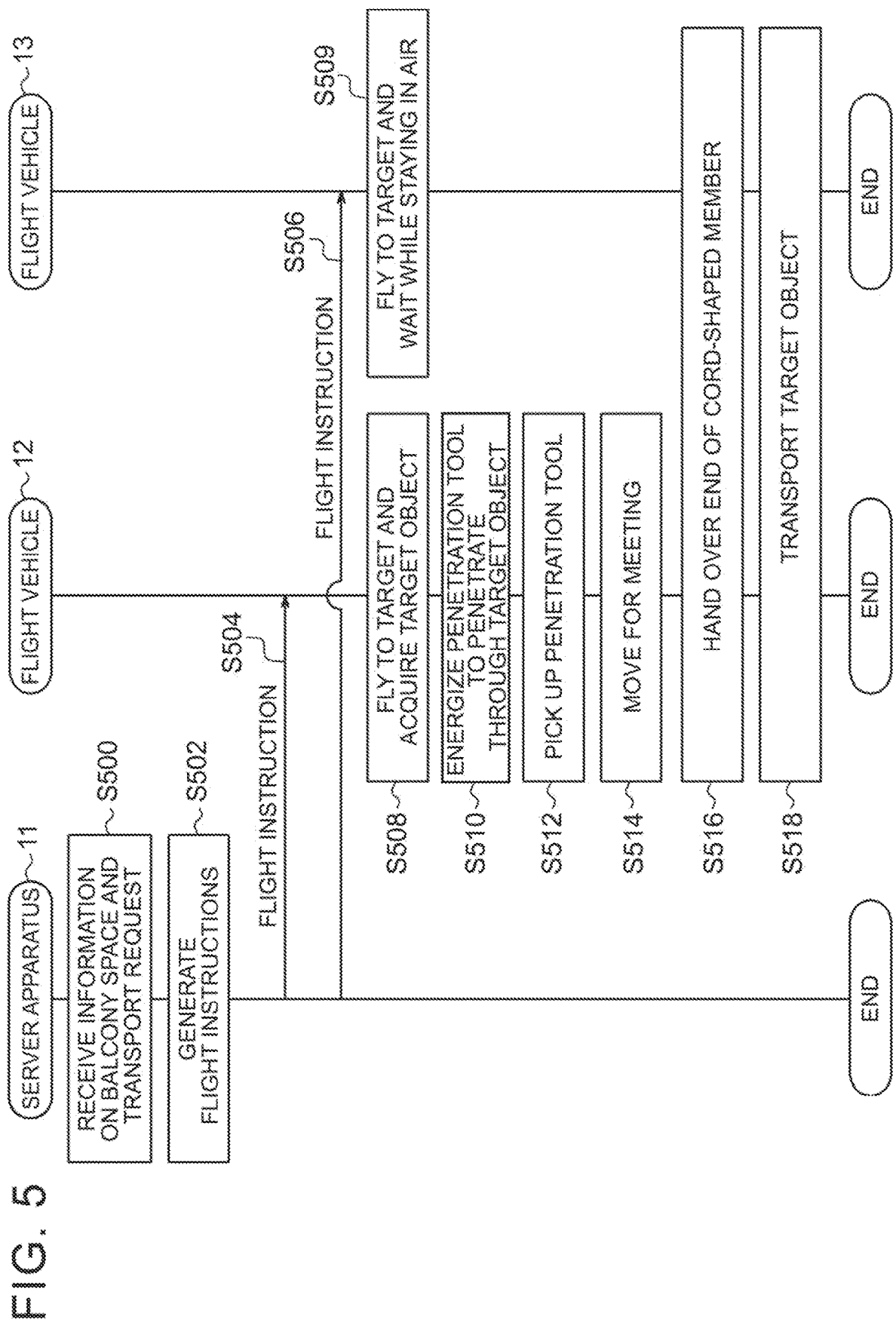

SERVER APPARATUS, SYSTEM, FLIGHT VEHICLE, AND OPERATION METHOD FOR SYSTEM

CROSS-REFERENCE TO RELATED APPLICATION

This application claims priority to Japanese Patent Application No. 2021-058450 filed on Mar. 30, 2021, incorporated herein by reference in its entirety.

BACKGROUND

1. Technical Field

The disclosure relates to a server apparatus, a system, a flight vehicle, and an operation method for a system.

2. Description of Related Art

In recent years, a method of transporting various target objects with an unmanned flight vehicle, such as a drone, has been suggested. With regard to the technology, Japanese Unexamined Patent Application Publication No. 2018-203056 (JP 2018-203056 A) describes a container apparatus that stores a target object to be transported by a drone.

SUMMARY

When a flight vehicle transports a target object, a flight operation is constrained depending on the size of space in which the flight vehicle is able to fly, so there is room for improvement in the flight operation of the flight vehicle.

Hereinafter, a server apparatus and the like capable of efficiently improving a flight operation with flight vehicles even when subjected to flight space constraints.

An aspect of the disclosure relates to a server apparatus. The server apparatus includes a communication unit, and a control unit configured to send an instruction for causing a plurality of flight vehicles to perform a flight operation, to the plurality of flight vehicles. The flight operation includes energizing, by a first flight vehicle, a penetration tool toward a target object placed in a predetermined space, holding a first part, penetrated through the target object, and a second part, not penetrated through the target object, of a cord-shaped member attached to the penetration tool, and flying to outside the predetermined space, waiting, by a second flight vehicle, outside the predetermined space and receiving any one of the first and second parts from the first flight vehicle, and towing, by the first and second flight vehicles, the target object with the cord-shaped member and transporting the target object to outside the predetermined space by flying while respectively holding any one and the other of the first and second parts.

Another aspect of the disclosure relates to a flight vehicle. The flight vehicle includes a communication unit, a control unit configured to receive an instruction from a server apparatus via the communication unit, and a holding mechanism configured to hold a penetration tool. The control unit is configured to, under control in accordance with the instruction, execute energizing a penetration tool toward a target object placed in a predetermined space, holding a first part, penetrated through the target object, and a second part, not penetrated through the target object, of a cord-shaped member attached to the penetration tool, and flying to outside the predetermined space, handing over any one of the first and second parts to another flight vehicle waiting outside the predetermined space, and towing the target object with the cord-shaped member and transporting the target object to outside the predetermined space by flying together with the other flight vehicle while the flight vehicles are respectively holding any one and the other of the first and second parts.

Further another aspect of the disclosure relates to an operation method for a system including a server apparatus and a plurality of flight vehicles. The operation method includes sending, by the server apparatus, a flight instruction to first and second flight vehicles, energizing, by the first flight vehicle, a penetration tool toward a target object placed in a predetermined space, holding a first part, penetrated through the target object, and a second part, not penetrated through the target object, of a cord-shaped member attached to the penetration tool, and flying to outside the predetermined space, waiting, by the second flight vehicle, outside the predetermined space and receiving any one of the first and second parts from the first flight vehicle, and towing, by the first and second flight vehicles, the target object with the cord-shaped member and transporting the target object to outside the predetermined space by flying while respectively holding any one and the other of the first and second parts.

According to the aspects of the disclosure, it is possible to efficiently improve a flight operation with flight vehicles even when subjected to flight space constraints.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a sequence diagram showing an operation example of the transport system;

DETAILED DESCRIPTION OF EMBODIMENTS

Hereinafter, an embodiment will be described.

Figure 1:
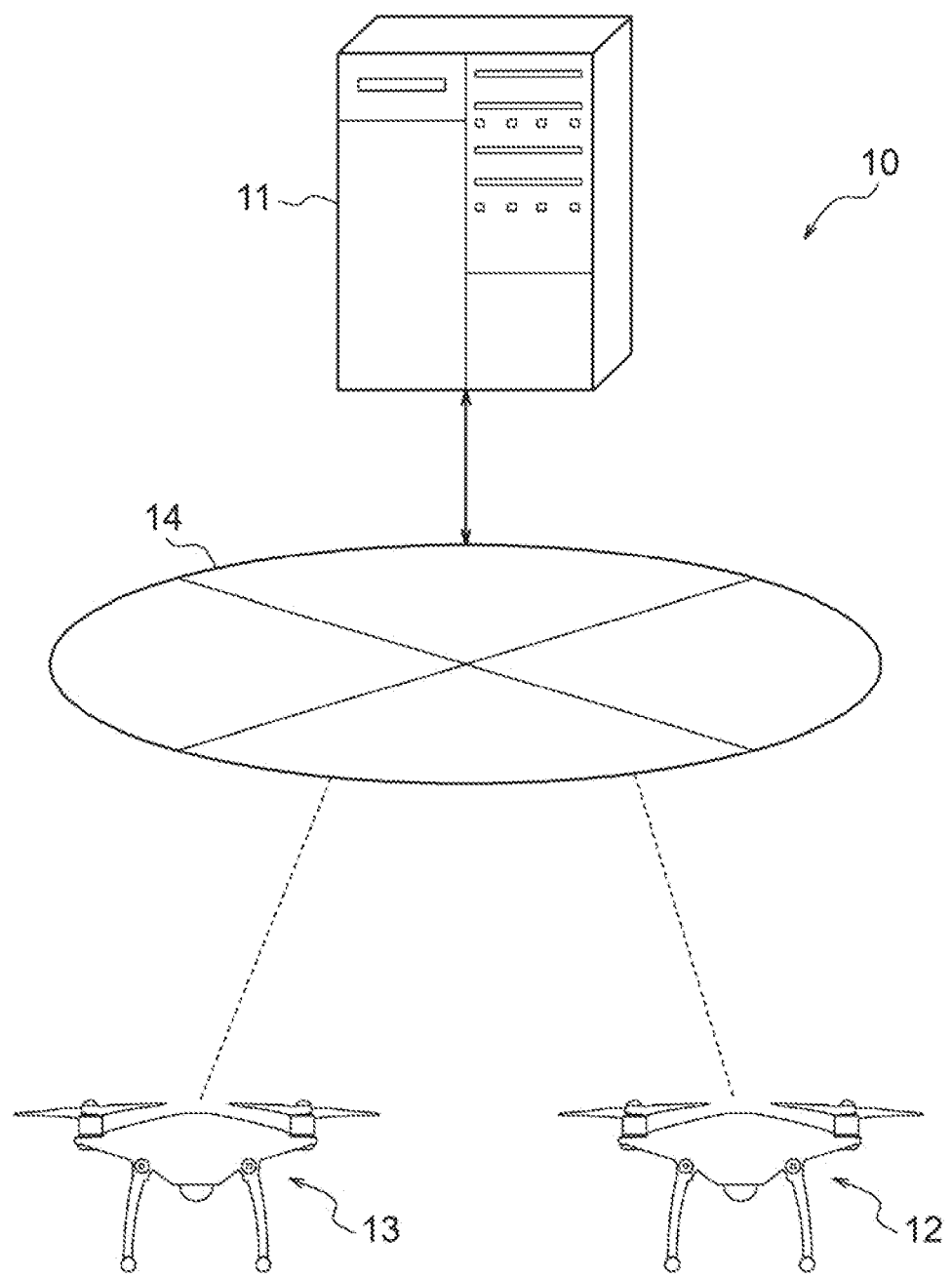
FIG. 1 is a diagram showing a configuration example of a transport system.

FIG. 1 is a diagram showing a configuration example of a transport system according to the present embodiment. As shown in FIG. 1, the transport system 10 includes a server apparatus 11, and flight vehicles 12, 13 that transport a target object under control of the server apparatus 11. The server apparatus 11 and the flight vehicles 12, 13 are connected to each other via a network 14 such that information communication is possible. The server apparatus 11 is, for example, a server that belongs to a cloud computing system or another computing system and that implements various functions. The flight vehicles 12, 13 are drones that generate lift by rotating a plurality of rotary wings with power obtained by using electric power or the like and fly in the air. The flight vehicles 12, 13 fly under autonomous control upon receiving an instruction from the server apparatus 11 in the present embodiment. Alternatively, the flight vehicles 12, 13 may fly through remote operation as needed. As will be described later, the flight vehicles 12, 13 have a mechanism for transporting a target object. The network 14 is, for example, the Internet and may include an ad hoc network, a local area network (LAN), a metropolitan area network (MAN), or another network, or any combination of them.

Figure 2A:
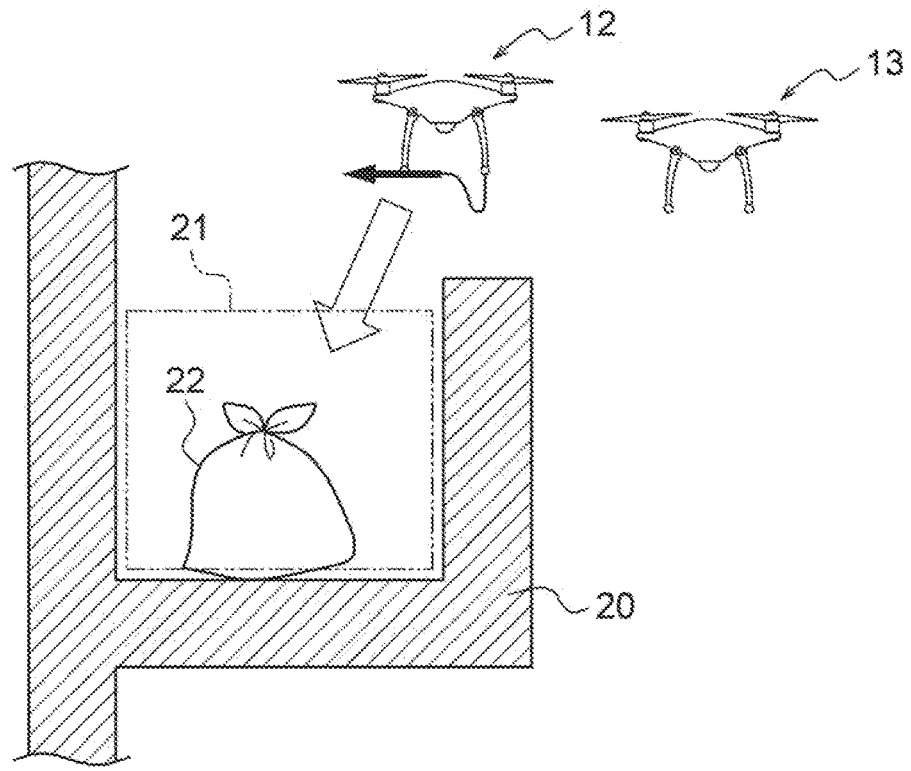
FIG. 2A is a view illustrating an operation of the transport system.
Figure 2B:
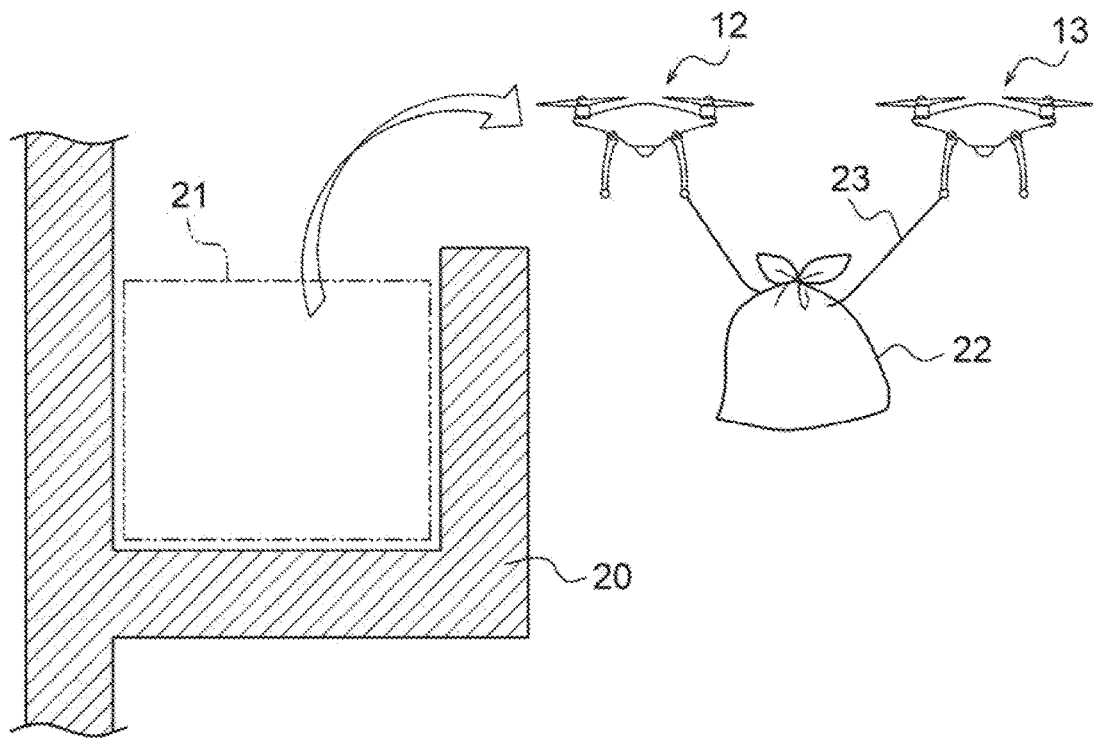
FIG. 2B is a view illustrating an operation of the transport system.

FIG. 2A and FIG. 2B are views showing the outline of an operation to transport a target object with the flight vehicles 12, 13 in the present embodiment. The flight vehicles 12, 13 transport a target object placed in a predetermined space to outside the predetermined space. In the present embodiment, the predetermined space is a space surrounded by a floor surface and parapet of each of balconies in collection facilities, including a condominium, an office building, and the like. FIG. 2A and FIG. 2B show schematic cross-sectional views of a balcony 20 of a collection facility. A balcony space 21 serving as the predetermined space is a space corresponding to a volume according to the dimensions and shape of the floor surface of the balcony 20 and the height of the parapet. The balcony space 21 has, for example, dimensions and a shape such that a rectangular parallelepiped shape, several tens to several hundreds of centimeters on a side, is occupied. A target object is, for example, a trash bag 22 made of polyethylene or another general-purpose resin with a volume of about 20 to about 90 liters. The flight vehicles 12, 13 respectively hold both ends of a cord-shaped member 23 penetrated through the trash bag 22 and cooperatively suspend and transport the trash bag 22 with the cord-shaped member 23. Examples of the cord-shaped member 23 include a rope made of a chemical fiber, such as nylon and polyester, a rope made of a natural fiber, such as cotton and hemp, and a wire or chain made of a metal. Each of the flight vehicles 12, 13 includes a power device, such as a motor, capable of outputting lift for the flight operation, so each of the flight vehicles 12, 13 has a body with a certain size. Each of the flight vehicles 12, 13 has, for example, dimensions and a shape that occupy a rectangular parallelepiped space, several tens to one hundred and several tens of centimeters on a side. Then, because of constraints of the size of the balcony space 21, the flight vehicles 12, 13 may not be able to enter the balcony space 21 at the same time and perform work for penetrating the cord-shaped member 23 through the trash bag 22. In the present embodiment, in order for the flight vehicles 12, 13 to be able to cooperatively transport the trash bag 22, the server apparatus 11 individually controls the flight operation of each of the flight vehicles 12, 13.

In the present embodiment, the server apparatus 11 sends an instruction to the flight vehicles 12, 13 to perform the following flight operation. The flight vehicle 12 energizes a penetration tool toward the trash bag 22 serving as a target object, placed in the balcony space 21 as the predetermined space, holds a first part, penetrated through the trash bag 22, and a second part, not penetrated through the trash bag 22, of the cord-shaped member 23 attached to the penetration tool, and flies to outside the balcony space 21. The flight vehicle 13 waits outside the balcony space 21 and receives any one of the first and second parts of the cord-shaped member 23 from the flight vehicle 12. The flight vehicles 12, 13 tow and suspend the trash bag 22 with the cord-shaped member 23 and transport the trash bag 22 to outside the balcony space 21 by flying while respectively holding any one and the other of the first and second parts of the cord-shaped member 23. In this way, even when the flight vehicles 12, 13 are not able to enter the balcony space 21 at the same time, the flight vehicles 12, 13 are able to cooperatively transport the trash bag 22 to outside the balcony space 21.

Figure 3:
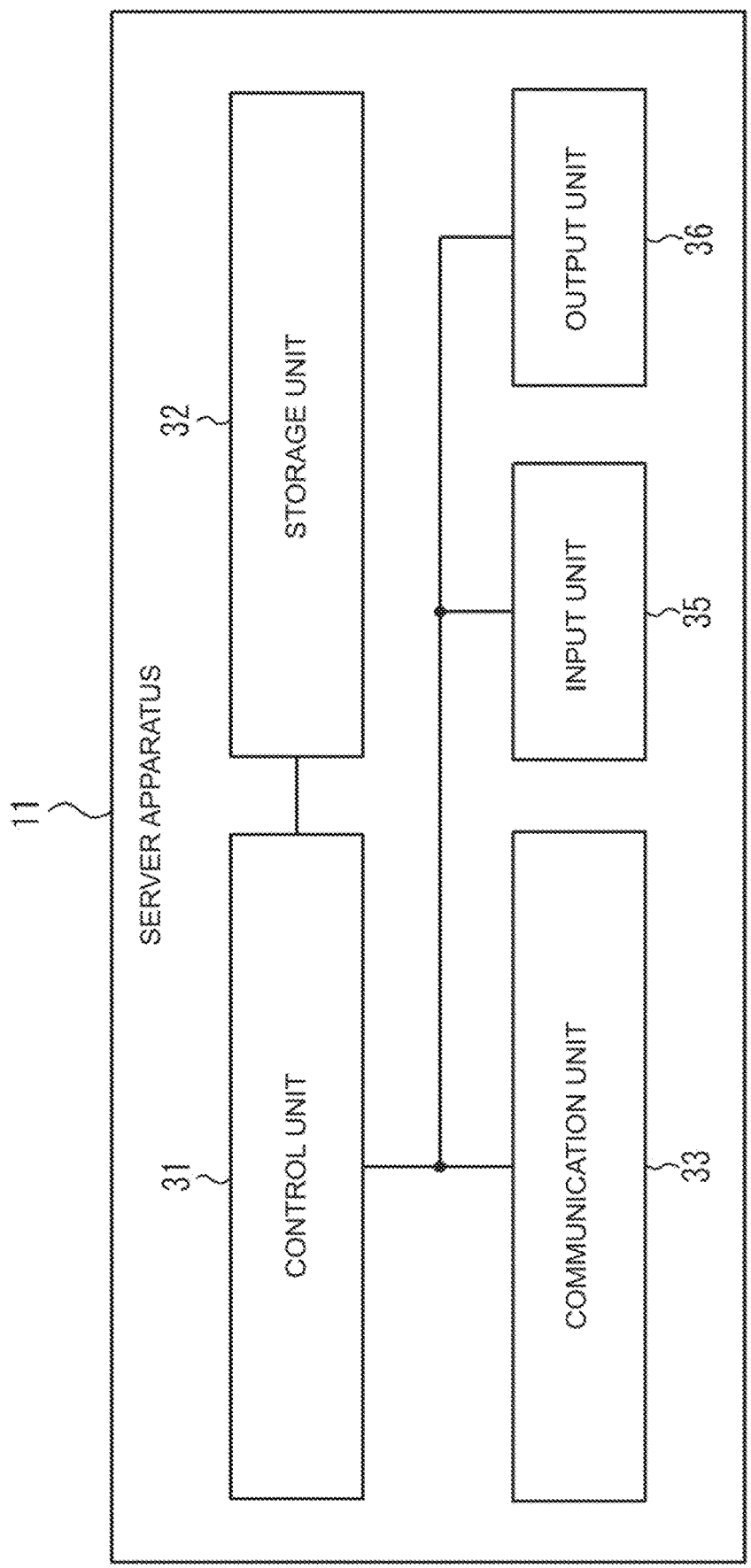
FIG. 3 is a diagram showing a configuration example of a server apparatus.

FIG. 3 shows a configuration example of the server apparatus 11. The server apparatus 11 includes a control unit 31, a storage unit 32, a communication unit 33, an input unit 35, and an output unit 36. The server apparatus 11 is, for example, a server computer that belongs to a cloud computing system or another computing system and that functions as a server implementing various functions. The server apparatus 11 may be one or more server computers that are connected to each other such that information communication is possible and that operate in cooperation with each other.

The control unit 31 includes one or more processors, one or more dedicated communication circuits, or a combination of them. The processor is, for example, a general-purpose processor, such as a central processing unit (CPU), or a special-purpose processor, such as a graphics processing unit (GPU), specialized in a specific process. The dedicated communication circuit is, for example, a field-programmable gate array (FPGA), an application specific integrated circuit (ASIC), or the like. The control unit 31 executes information processing according to the operation of the server apparatus 11 while controlling the units of the server apparatus 11.

The storage unit 32 includes, for example, one or more semiconductor memories, one or more magnetic memories, one or more optical memories, or a combination of at least two types of them, that function as a main storage device, an auxiliary storage device, or a cache memory. The semiconductor memory is, for example, a random access memory (RAM) or a read only memory (ROM). The RAM is, for example, a static RAM (SRAM) or a dynamic RAM (DRAM). The ROM is, for example, an electrically erasable programmable ROM (EEPROM). The storage unit 32 stores information used in the operation of the server apparatus 11 and information obtained through the operation of the server apparatus 11.

The communication unit 33 includes one or more communication interfaces. The communication interface is, for example, a LAN interface. The communication unit 33 receives information used in the operation of the server apparatus 11 and sends information obtained through the operation of the server apparatus 11. The server apparatus 11 is connected to the network 14 by the communication unit 33 and performs information communication with another apparatus via the network 14.

The input unit 35 includes one or more input interfaces. The input interface is, for example, a physical key, a capacitance key, a pointing device, a touch screen provided integrally with a display, or a microphone that receives voice input. The input interface may further include a camera that takes a captured image or an image code or an integrated circuit (IC) card reader. The input unit 35 receives operation to input information used in the operation of the server apparatus 11 and sends the input information to the control unit 31.

The output unit 36 includes one or more output interfaces. The output interface is, for example, a display or a speaker. The display is, for example, a liquid crystal display (LCD) or an organic electro-luminescence (EL) display. The output unit 36 outputs information obtained by the operation of the server apparatus 11.

The functions of the server apparatus 11 are implemented by the processor of the control unit 31, running a control program. The control program is a program for causing a computer to execute processes of steps included in the operation of the server apparatus 11 to cause the computer to achieve functions corresponding to the processes of steps. In other words, the control program is a program for causing a computer to function as the server apparatus 11.

Figure 4:
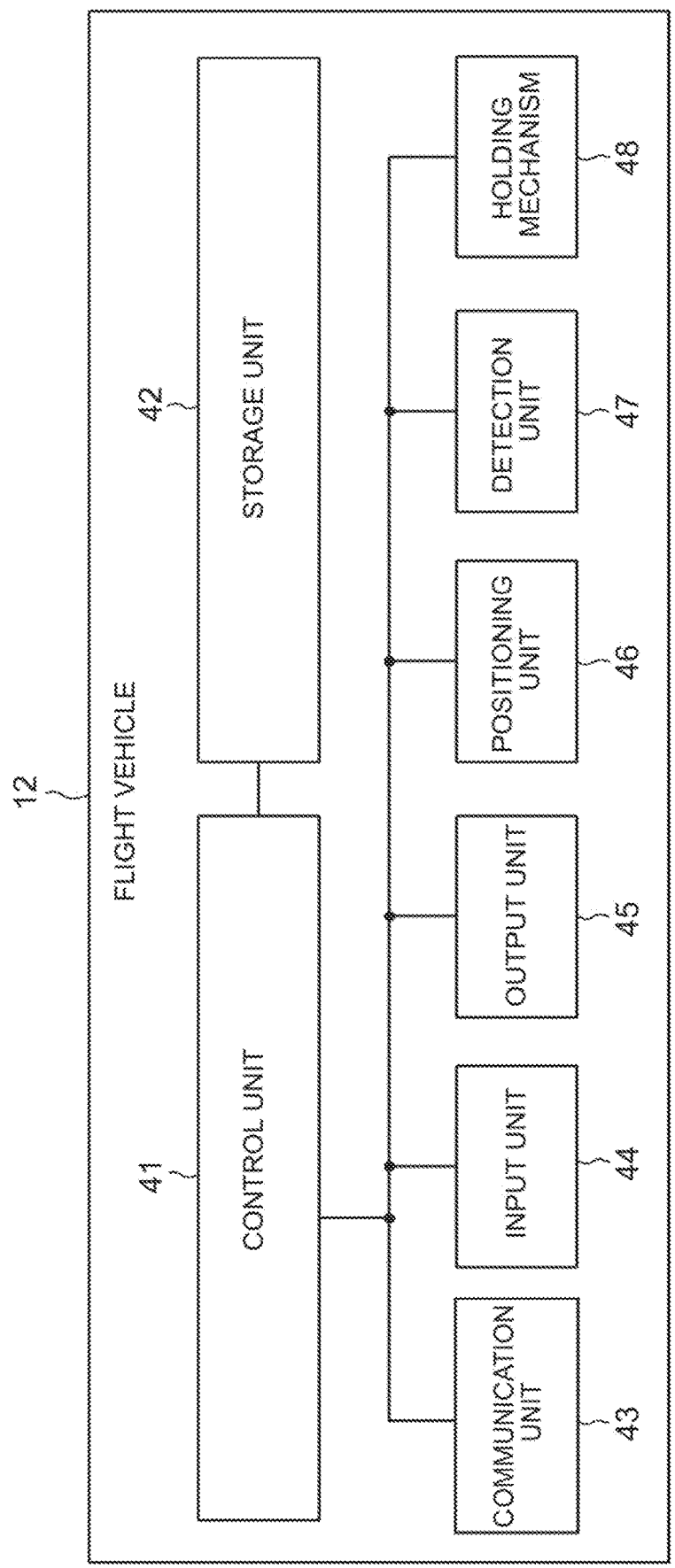
FIG. 4 is a diagram showing a configuration example of a flight vehicle.

FIG. 4 shows a configuration example of the flight vehicle 12. The description of the flight vehicle 12 shown in FIG. 4 as an example also applies to the flight vehicle 13 unless otherwise specified. The flight vehicle 12 includes a control unit 41, a storage unit 42, a communication unit 43, a positioning unit 44, an input unit 45, an output unit 46, a detection unit 47, and a holding mechanism 48.

The control unit 41 includes one or more processors, one or more dedicated communication circuits, or a combination of them. The processor is, for example, a general-purpose processor, such as a CPU, or a special-purpose processor specialized in a specific process. The dedicated communication circuit is, for example, an FPGA or an ASIC. The control unit 41 executes information processing according to the operation of the flight vehicle 12 while controlling the units of the flight vehicle 12.

The storage unit 42 includes, for example, one or more semiconductor memories, one or more magnetic memories, one or more optical memories, or a combination of at least two types of them, that function as a main storage device, an auxiliary storage device, or a cache memory. The semiconductor memory is, for example, a RAM or a ROM. The RAM is, for example, an SRAM or a DRAM. The ROM is, for example, an EEPROM. The storage unit 42 executes information processing according to the operation of the flight vehicle 12 and stores information used in the operation of the flight vehicle 12 and information obtained through the operation of the flight vehicle 12.

The communication unit 43 includes one or more communication interfaces. The communication interface is, for example, an interface that supports a mobile communication standard, such as long term evolution (LTE), 4th generation (4G), and 5th generation (5G). The communication unit 43 receives information used in the operation of the control unit 41 and sends information obtained through the operation of the control unit 41. The control unit 41 is connected to the network 14 via a mobile communication base station by the communication unit 43 and performs information communication with another apparatus via the network 14.

The positioning unit 44 includes one or more global navigation satellite system (GNSS) receivers. The GNSS includes, for example, at least one of Global Positioning System (GPS), Quasi-Zenith Satellite System (QZSS), BeiDou, Global Navigation Satellite System (GLONASS), and Galileo. The positioning unit 44 acquires location information on the flight vehicle 12.

The input unit 45 includes one or more input interfaces. The input interface is a camera that takes a captured image, a physical key, a capacitance key, a pointing device, a touch screen provided integrally with a display, or a microphone that receives voice input. The input interface may further include an IC card reader. The input unit 45 receives operation to input information used in the operation of the control unit 41 and sends the input information to the control unit 41.

The output unit 46 includes one or more output interfaces. The output interface is, for example, a display or a speaker. The display is, for example, an LCD or an organic EL display. The output unit 46 outputs information obtained by the operation of the control unit 41.

The detection unit 47 has sensors that detect the state of movement of the flight vehicle 12 and a situation around the flight vehicle 12. The state of movement of the flight vehicle 12 includes flying speed, altitude, the inclination of attitude, and the like. The sensors that detect such state of movement include a speed sensor, an altitude sensor, an angular velocity sensor, and the like. The situation around the flight vehicle 12 includes whether there is another object, such as an obstacle, a distance from another object, and the like. The sensors that detect such a situation include an image sensor, a distance sensor, and the like. The detection unit 47 sends results detected by the sensors to the control unit 41.

The holding mechanism 48 includes a mechanism for holding the penetration tool to be penetrated through the trash bag 22, and its control circuit. The penetration tool is a rod-shaped member having such a rigidity as to be penetrated through the trash bag 22 with a sharp distal end. The penetration tool is, for example, a metal or plastic spear with a length of over ten centimeters to several tens of centimeters. The holding mechanism 48 holds or releases the penetration tool in response to an instruction from the control unit 41. The holding mechanism 48 includes, for example, an electromagnet for attracting the metal penetration tool and its control circuit or a pair of arms capable of gripping the penetration tool by opening and closing with an actuator and its control circuit. Alternatively, the holding mechanism 48 may include a launch mechanism capable of holding the penetration tool by loading the penetration tool in advance and launching the penetration tool by energizing the penetration tool with compressed air, the elastic force of an elastic member, or the like in response to an instruction from the control unit 41. In the flight vehicle 13, the holding mechanism 48 does not need to include a launch mechanism for a penetration tool. The holding mechanism 48 holds the terminal end of the cord-shaped member 23 of which the distal end is attached to the penetration tool such that the terminal end is detachable. The holding mechanism 48 may, for example, attract or release a metal piece attached to the terminal end of the cord-shaped member 23 with the electromagnet or grip or release the terminal end of the cord-shaped member 23 with the pair of arms. The holding mechanism 48 may include a reel to which the terminal end of the cord-shaped member 23 is fixed and that winds the cord-shaped member 23.

The flight operation and other operations of the flight vehicle 12 are achieved by a power unit and various mechanisms of the flight vehicle 12, operating in response to an instruction from the control unit 41. An instruction issued from the control unit 41 is generated by the processor of the control unit 41 running a control program. One or some or all of the functions of the control unit 41 may be implemented by the dedicated communication circuit included in the control unit 41.

FIG. 5 is a sequence diagram showing an operation procedure of the transport system 10. FIG. 5 shows the procedure of cooperative operation among the server apparatus 11 and the flight vehicles 12, 13. In the operation shown in FIG. 5, when the server apparatus 11 exchanges various pieces of information with other apparatuses including the flight vehicles 12, 13, the control unit 31 of the server apparatus 11 sends information to the other apparatuses via the communication unit 33 and receives information from the other apparatuses. When each of the flight vehicles 12, 13 exchanges information with other apparatuses including the server apparatus 11, the control unit 41 of each of the flight vehicles 12, 13 receives information from the other apparatuses and sends information to the other apparatuses via the communication unit 43. When the server apparatus 11 executes various information processing, the control unit 31 executes processing by using information stored in the storage unit 32. When each of the flight vehicles 12, 13 executes flight or another operation, the control unit 41 of each of the flight vehicles 12, 13 generates and outputs an instruction for various operations, and the power unit and various mechanisms operate in response to the instruction, with the result that various operations of each of the flight vehicles 12, 13 are achieved.

The procedure of FIG. 5 is executed when, for example, a resident or the like of a collection facility makes a request to collect the trash bag 22. For example, the resident or the like puts the trash bag 22 at a predetermined location of the balcony space 21, sends a request to transport the trash bag 22 to the server apparatus 11 together with information on the balcony space 21 in which the trash bag 22 is put, with a general-purpose communication terminal, such as a smartphone, or a special-purpose communication terminal installed in the collection facility or the like. Information on the balcony space 21 is information that identifies the balcony space 21 and is information that identifies a dwelling unit or the like in the collection facility, location information on the balcony space 21, or the like. Then, the server apparatus 11 receives the information on the balcony space 21 and the transport request in step S500.

In step S502, the server apparatus 11 generates a flight instruction to the flight vehicles 12, 13 based on the information on the balcony space 21. The storage unit 32 of the server apparatus 11 stores in advance information on the shape, dimensions, spatial coordinates, and the like of the balcony space 21 for each of the balconies provided in the collection facility, information on a location at which the trash bag 22 is put, and information on a parking place of each of the flight vehicles 12, 13. The parking place of each of the flight vehicles 12, 13 is, for example, provided at any location on a roof floor or in a site of the collection facility. The control unit 31 determines a target in flight of each of the flight vehicles 12, 13 and a flight route from the associated parking place to the target in accordance with a selected algorithm, and generates a flight instruction including the target, the flight route, and various operations during flight.

In step S504 and step S506, the server apparatus 11 sends the flight instructions respectively to the flight vehicles 12, 13. The flight vehicles 12, 13 respectively receive the flight instructions.

The flight vehicles 12, 13 respectively execute operations from step S508 based on the associated flight instructions. Here, an example in which the flight vehicle 12 executes operations in accordance with the flight instruction received from the server apparatus 11 in step S504 and the flight vehicle 13 executes operations in accordance with the flight instruction received from the server apparatus 11 in step S506 will be described. Alternatively, the server apparatus 11 may send a flight instruction to each of the flight vehicles 12, 13 at separate timing as needed. For example the server apparatus 11 may generate a flight instruction for the next operation upon receiving information indicating the status of execution of the operation at that time occasionally from one of the flight vehicles 12, 13 and send the generated flight instruction to the one of the flight vehicles 12, 13, and the one of the flight vehicles 12, 13 may occasionally execute an operation according to the flight instruction.

The operation of the flight vehicle 12 in step S508, step S510, step S512, and step S514 will be described additionally with reference to FIG. 6A to FIG. 6E. FIG. 6A to FIG. 6E are views schematically showing the flight operation of the flight vehicle 12.

Figure 6A:
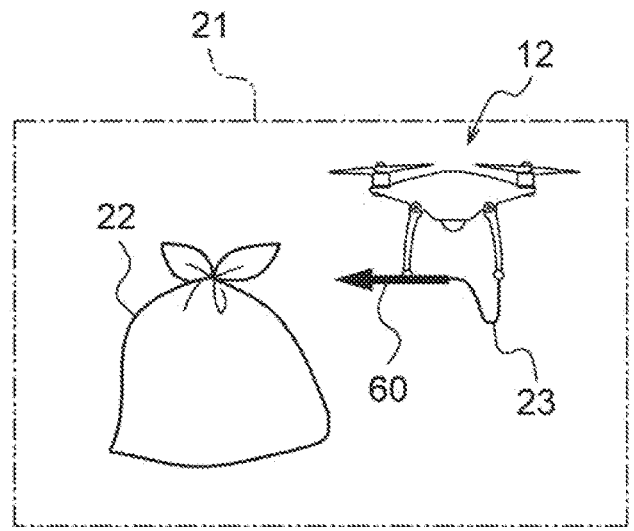
FIG. 6A is a view illustrating an operation of the flight vehicle.

In step S508, the flight vehicle 12 flies to the target and acquires a target object. The target is, for example, selected spatial coordinates in the balcony space 21. As shown in FIG. 6A, as the flight vehicle 12 enters the balcony space 21 and reaches the target, the control unit 41 acquires the trash bag 22 with the detection unit 47. The control unit 41 acquires the trash bag 22 by deriving the presence of the trash bag 22 and a distance to the trash bag 22 based on the detection result from the detection unit 47. For example, when the image sensor of the detection unit 47 captures an image around the flight vehicle 12 and sends the captured image to the control unit 41, the control unit 41 executes image processing including pattern recognition on the captured image and detects the image of the trash bag 22. When the distance sensor of the detection unit 47 measures a distance to the trash bag 22 and sends the measured result to the control unit 41, the control unit 41 derives a distance to the trash bag 22 based on the measured result. In FIG. 6A, the flight vehicle 12 holds a penetration tool 60 and another end of the cord-shaped member 23, one end of which is connected to the penetration tool 60, with the holding mechanism 48.

In step S510, the flight vehicle 12 energizes the penetration tool 60 toward the trash bag 22 that is the target object and causes the penetration tool 60 to penetrate through the target object.

Figure 6B:
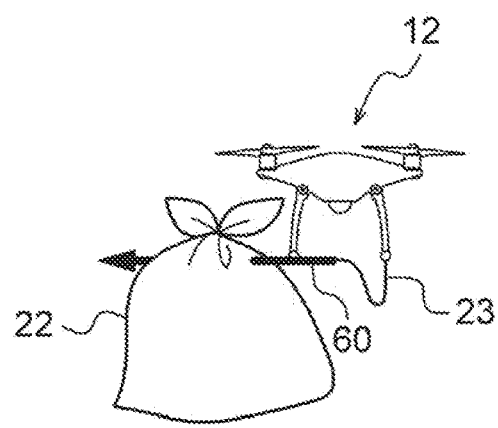
FIG. 6B is a view illustrating an operation of the flight vehicle.

For example, as shown in FIG. 6B, the flight vehicle 12 energizes the penetration tool 60 by moving with propelling force greater than or equal to a certain value in a state where the penetration tool 60 is held by the holding mechanism 48. At this time, the flight vehicle 12 moves in a direction at an angle at which the distal end of the penetration tool 60 sticks the trash bag 22. At this time, the control unit 41, for example, determines the direction and angle of movement based on the captured image and distance information such that the penetration tool 60 sticks at a location around an opening where it is highly likely that there is no content in the trash bag 22, for example, a location within a selected distance from the opening recognized by image. A selected magnitude of propelling force to be generated by the flight vehicle 12 is set in advance in consideration of the rigidity of the raw material of the trash bag 22 and the rigidity of the penetration tool 60. Thus, the distal end of the penetration tool 60 sticks the trash bag 22 and penetrates through the trash bag 22.

Figure 6C:
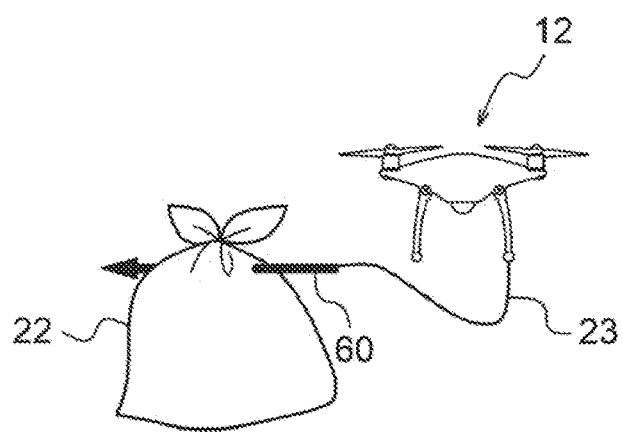
FIG. 6C is a view illustrating an operation of the flight vehicle.

As shown in FIG. 6C, the flight vehicle 12 energizes the penetration tool 60 by launching the penetration tool 60 with the launch mechanism provided in the holding mechanism 48. At this time, the flight vehicle 12 launches the penetration tool 60 toward the trash bag 22 in a state of staying in the air at a selected location at which the distal end of the launched penetration tool 60 sticks the trash bag 22. A selected location at which the flight vehicle 12 stays in the air is set in advance in consideration of the rigidity of the raw material of the trash bag 22, the rigidity of the penetration tool 60, and the magnitude of force to be added to the penetration tool 60 by the launch mechanism. At this time, the control unit 41, for example, determines the location at which the flight vehicle 12 stays in the air based on the captured image and distance information such that the penetration tool 60 sticks at a location around the opening where it is highly likely that there is no content in the trash bag 22. Thus, the distal end of the penetration tool 60 sticks the trash bag 22 and penetrates through the trash bag 22.

Figure 6D:
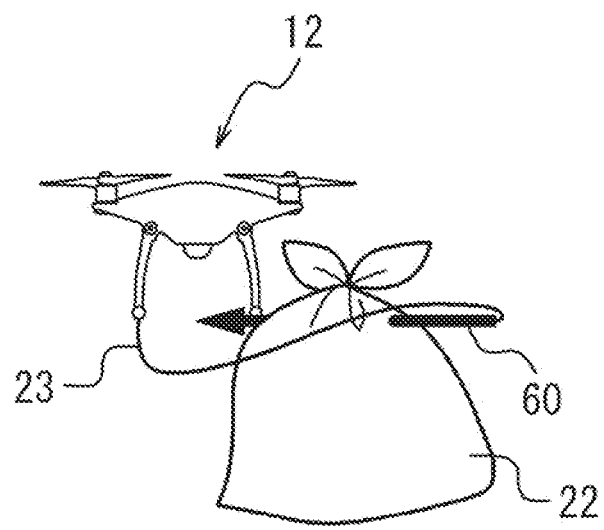
FIG. 6D is a view illustrating an operation of the flight vehicle.
Figure 6E:
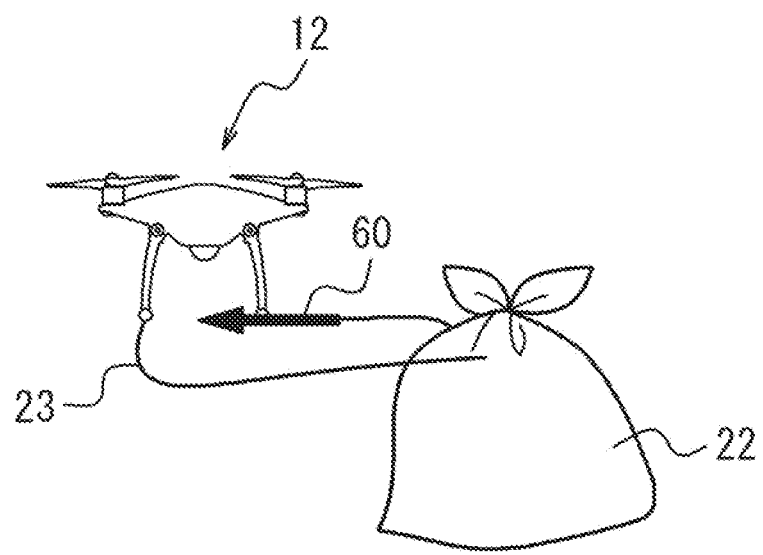
FIG. 6E is a view illustrating an operation of the flight vehicle.

In step S512, the flight vehicle 12 picks up the penetration tool 60 penetrated through the trash bag 22 that is the target object. For example, the flight vehicle 12, after reaching the state of FIG. 6B, causes the holding mechanism 48 to release the penetration tool 60 and moves to a location at which the distal end of the penetration tool 60 is able to be held again with the holding mechanism 48 as shown in FIG. 6D. Alternatively, the flight vehicle 12 releases the penetration tool 60 by causing the holding mechanism 48 to launch the penetration tool 60 as shown in FIG. 6C and then moves to the location at which the distal end of the penetration tool 60 is able to be held again with the holding mechanism 48 as shown in FIG. 6D. The flight vehicle 12 holds the end, that is, the distal end, of the penetration tool 60, penetrated through the trash bag 22, with the holding mechanism 48. The flight vehicle 12, as shown in FIG. 6E, moves to a location for pulling out the penetration tool 60 from the trash bag 22 and picks up the penetration tool 60. The location to which the flight vehicle 12 moves to hold the penetration tool 60 again and the location to which the flight vehicle 12 moves to cause the penetration tool 60 to penetrate through the trash bag 22 while holding the penetration tool 60 are, for example, derived by the control unit 41 based on information on the length of the penetration tool 60 given in advance, and the shape, location, and the like of the image-recognized trash bag 22.

Step S510 and step S512 are executed in a state where the flight vehicle 12 holds the terminal end of the cord-shaped member 23. Thus, when step S512 is executed and the penetration tool 60 is picked up, the flight vehicle 12 reaches a state where the flight vehicle 12 holds the penetration tool 60 penetrated through the trash bag 22 and holds the terminal end of the cord-shaped member 23 as shown in FIG. 6E. In other words, the flight vehicle 12 reaches a state where the flight vehicle 12 holds the distal end-side part of the cord-shaped member 23, penetrated through the trash bag 22, and the terminal end-side part of the cord-shaped member 23, not penetrated through the trash bag 22.

On the other hand, the flight vehicle 13 flies to the target in response to the flight instruction in step S509 of FIG. 5. The target is, for example, a selected location around the balcony space 21. Due to the constraints of the size of the balcony space 21, when the flight vehicle 12 is located in the balcony space 21, the flight vehicle 13 does not enter the balcony space 21. When the flight vehicle 13 reaches the target around the balcony space 21, the flight vehicle 13 waits while staying in the air.

Figure 7A:
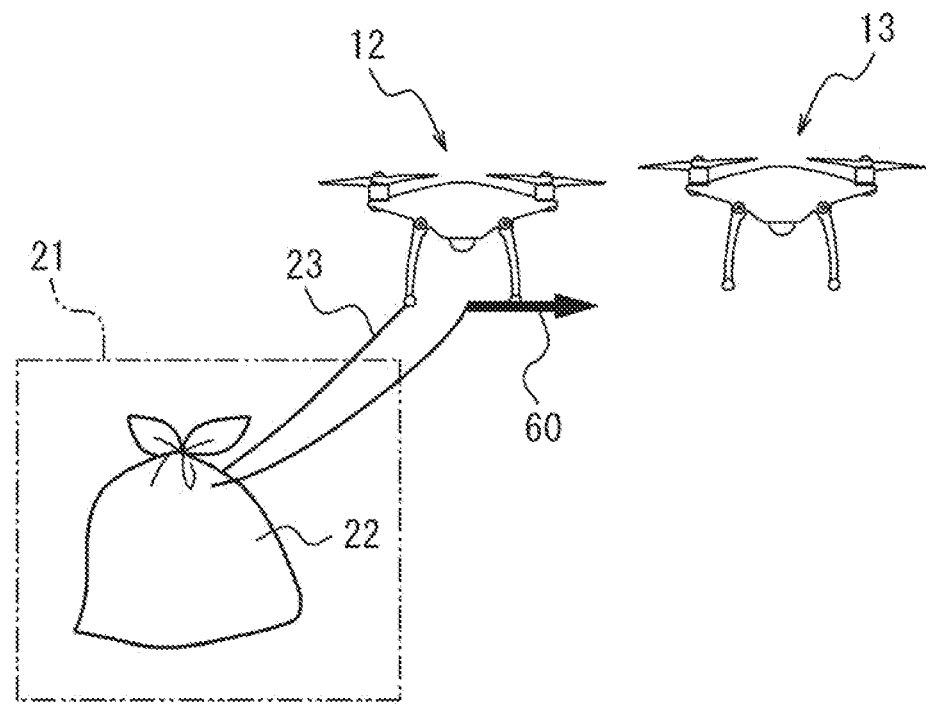
FIG. 7A is a view illustrating an operation of flight vehicles.
Figure 7B:
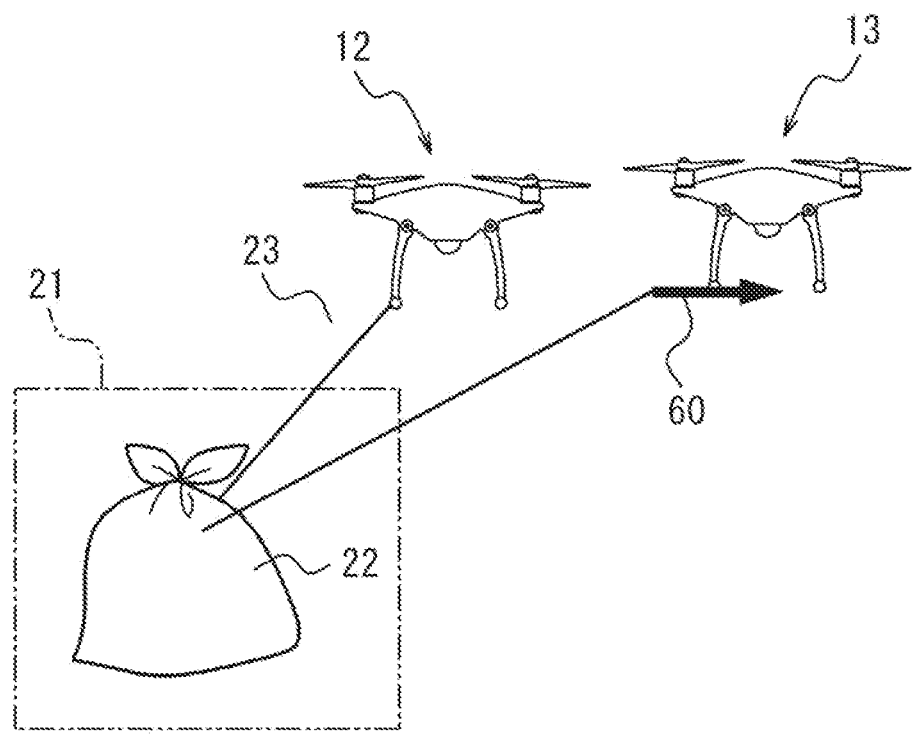
FIG. 7B is a view illustrating an operation of the flight vehicles.
Figure 7C:
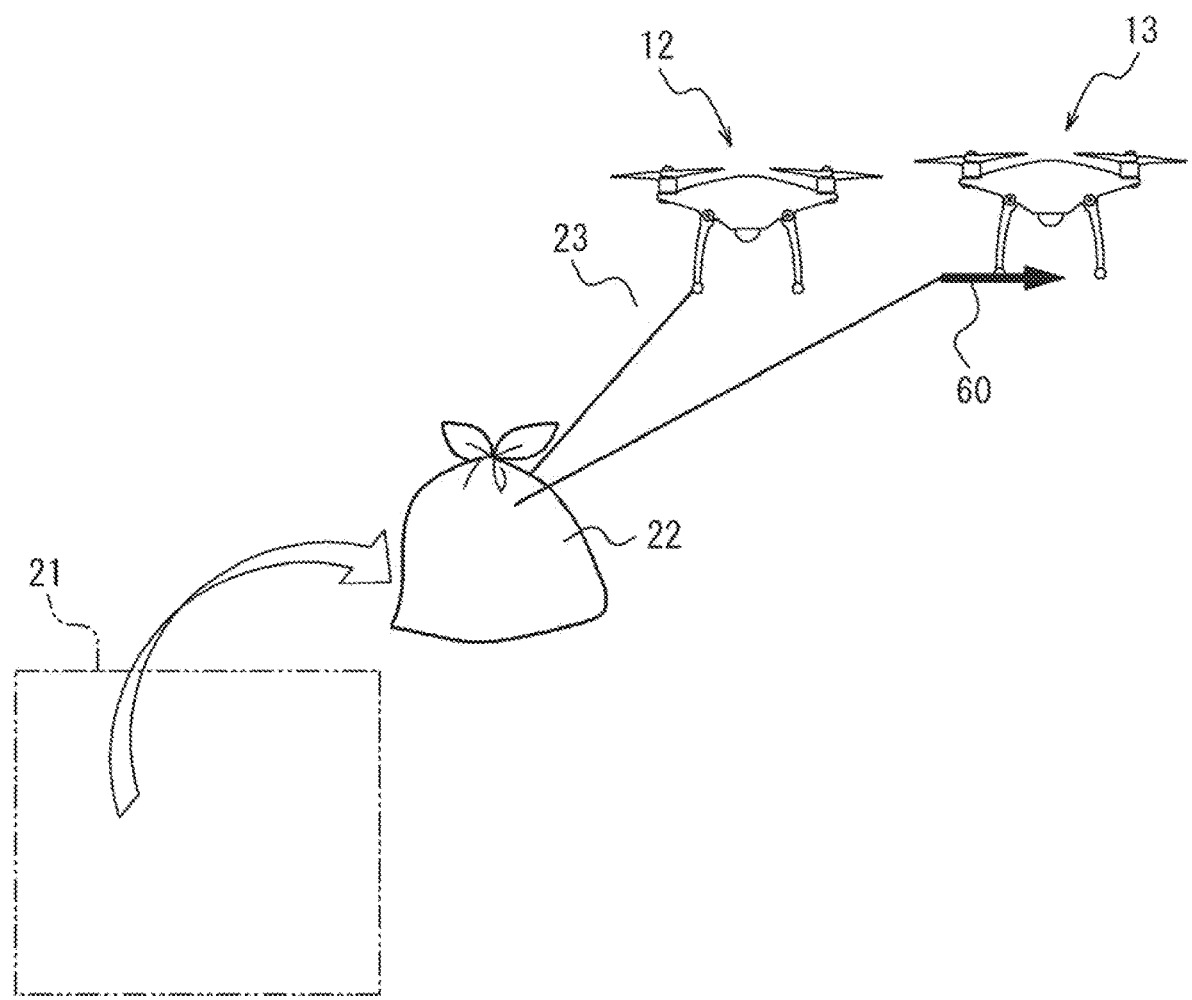
FIG. 7C is a view illustrating an operation of the flight vehicles.

The operation of each of the flight vehicles 12, 13 in step S514, step S516, and step S518 will be described with reference to FIG. 7A to FIG. 7C. FIG. 7A to FIG. 7C are views schematically showing the flight operations of each of the flight vehicles 12, 13.

In step S514, the flight vehicle 12 moves to the location at which the flight vehicle 13 is staying in the air to meet the flight vehicle 13. At this time, the flight vehicle 12 flies without moving the location of the trash bag 22 in a state where the distal end-side part, penetrated through the trash bag 22, of the cord-shaped member 23 and the terminal end-side part of the cord-shaped member 23 are held. Thus, a location at which the flight vehicle 13 stays in the air is a location to which the flight vehicle 12 is able to reach within the length of the cord-shaped member 23. The flight vehicle 12 acquires a location at which the flight vehicle 13 is waiting based on information sent in advance or occasionally from the server apparatus 11. As shown in FIG. 7A, when the flight vehicle 12 flies to the location at which the flight vehicle 13 outside the balcony space 21 is staying in the air to get close to the flight vehicle 13 within a selected predetermined distance, the flight vehicles 12, 13 meet each other.

In step S516, the flight vehicle 12 hands over one end of the cord-shaped member 23 to the flight vehicle 13. Then, as shown in FIG. 7B, the flight vehicle 12 hands over the penetration tool 60 to the flight vehicle 13. The flight vehicle 12 releases the penetration tool 60 from the holding mechanism 48. On the other hand, the flight vehicle 13 receives the penetration tool 60 by holding the penetration tool 60 with the holding mechanism 48. Thus, the distal end-side part of the cord-shaped member 23, penetrated through the trash bag 22, is handed over from the flight vehicle 12 to the flight vehicle 13. Alternatively, the flight vehicle 12 may hand over the terminal end of the cord-shaped member 23 to the flight vehicle 13. In this case, the flight vehicle 12 releases the terminal end of the cord-shaped member 23 from the holding mechanism 48. On the other hand, the flight vehicle 13 receives the terminal end of the cord-shaped member 23 by holding the terminal end of the cord-shaped member 23 with the holding mechanism 48. Thus, the terminal end-side part of the cord-shaped member 23, not penetrated through the trash bag 22, is handed over from the flight vehicle 12 to the flight vehicle 13.

In step S518, the flight vehicles 12, 13 transport the trash bag 22 that is the target object from the balcony space 21 that is the predetermined space. As shown in FIG. 7C, the flight vehicle 12 and the flight vehicle 13 move while any one of the flight vehicle 12 and the flight vehicle 13 holds the distal end-side part of the cord-shaped member 23, penetrated through the trash bag 22, and the other one holds the terminal end-side of the cord-shaped member 23, not penetrated through the trash bag 22. Thus, the flight vehicles 12, 13 tow and suspend the trash bag 22 with the cord-shaped member 23 and transport the trash bag 22 to outside the balcony space 21. Thus, the flight vehicles 12, 13, for example, transport the trash bag 22 to a predetermined trash collection site.

As described above, with the operations of the flight vehicles 12, 13, executed under control of the server apparatus 11, even when subjected to constraints of the size of the balcony space 21, the flight vehicles 12, 13 are able to cooperatively transport a trash bag.

Figure 8:
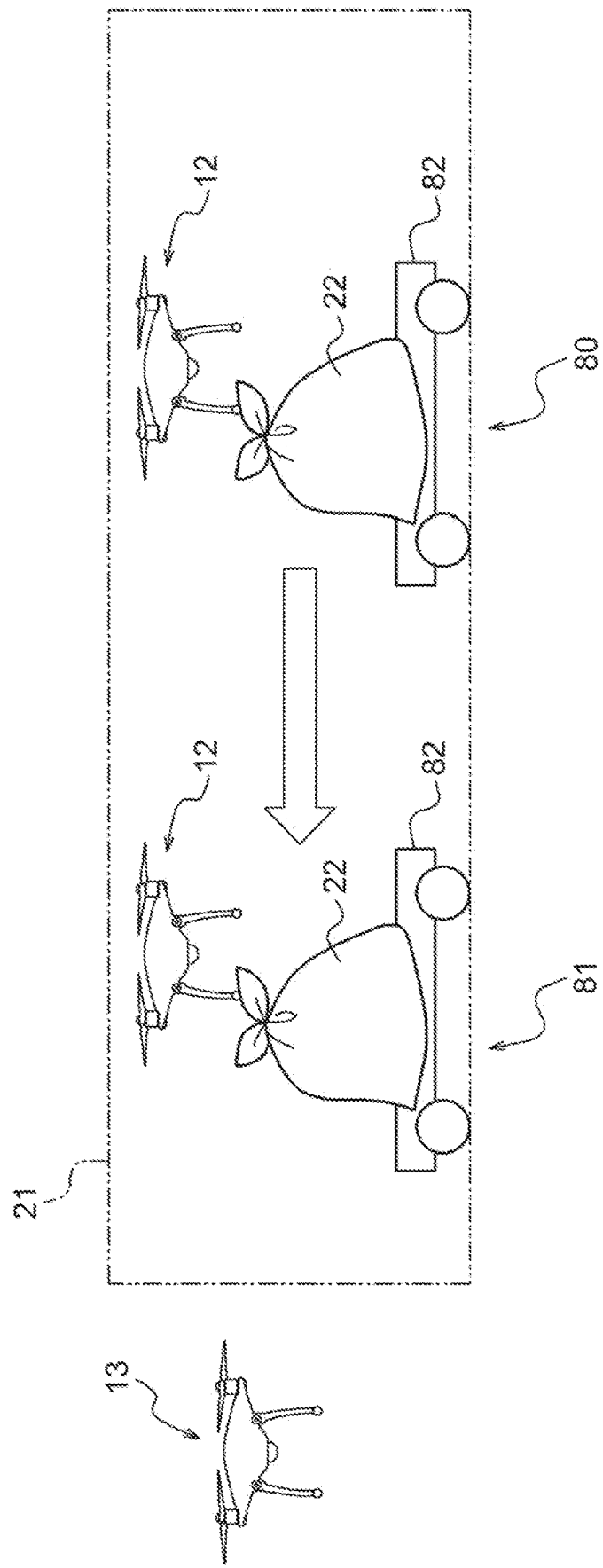
FIG. 8 is a view illustrating an operation of a flight vehicle according to a modification.

FIG. 8 is a view illustrating the operation of the flight vehicle 12 according to a modification. The operation in FIG. 8 is executed between step S508 and step S510 in FIG. 5.

Depending on the shape of the balcony space 21, there can be a certain distance between a location 80 at which the trash bag 22 is put first and a location 81 at which the flight vehicle 13 is able to easily ensure a space for staying in the air. In such a case, even when the flight vehicle 12 penetrates the cord-shaped member 23 through the trash bag 22 at the location 80, the flight vehicle 12 may not be able to move to a location at which the flight vehicle 12 is able to meet the flight vehicle 13 due to constraints of the length of the cord-shaped member 23. Alternatively, there can be a case where, for the shape and dimensions of the balcony space 21, the flight vehicle 12 is not able to ensure sufficient space for the flight operation to penetrate the penetration tool 60 through the trash bag 22 at the location 80 and is able to ensure the space at the location 81. In the modification, the flight vehicle 12 further includes a gripping mechanism configured to grip the trash bag 22. The gripping mechanism includes, for example, a pair of arms capable of gripping the trash bag 22 by opening and closing with an actuator that operates in response to an instruction from the control unit 41, and its control circuit. The flight vehicle 12 grips the trash bag 22 and tows and moves the trash bag 22 from the location 80 to the location 81. With this configuration, the operation from step S510 is possible, with the result that it is possible to transport the trash bag 22 with the flight vehicles 12, 13.

In a further suitable mode, a placement base 82 including a movement mechanism is provided on a floor surface of the balcony 20 corresponding to the balcony space 21. The placement base 82 is, for example, configured to be capable of sliding on the floor surface with wheels. With this configuration, the flight vehicle 12 is able to move the trash bag 22 from the location 80 to the location 81 with a smaller propelling force.

Figure 9:
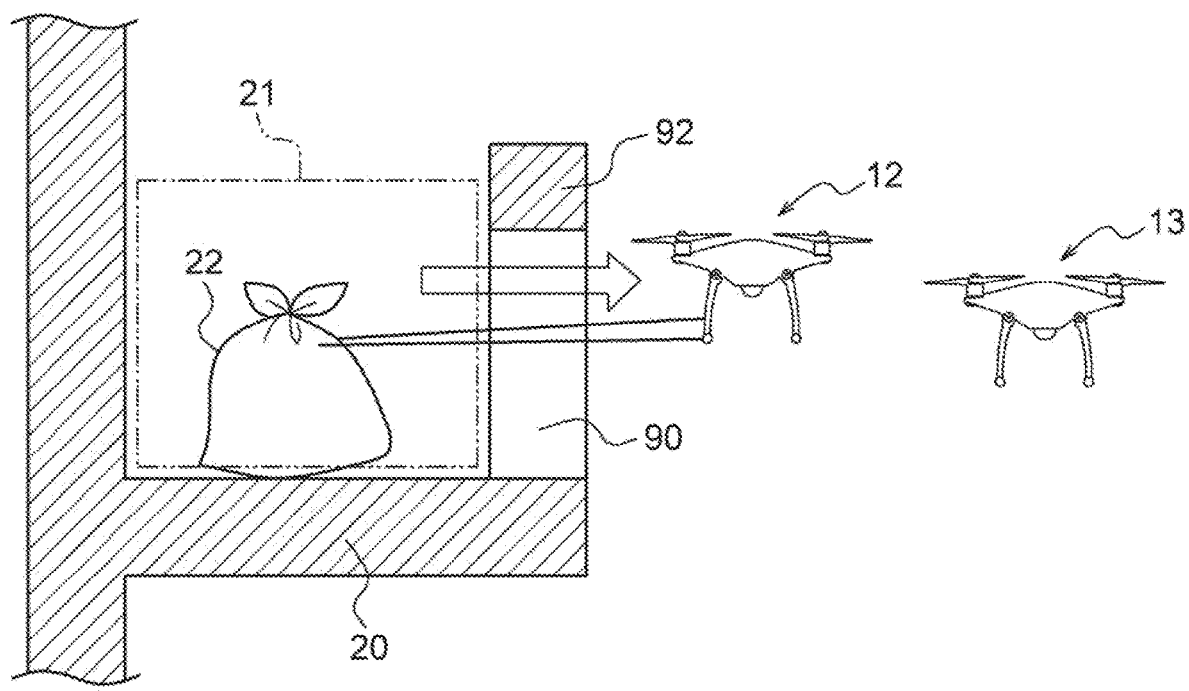
FIG. 9 is a view illustrating an operation of flight vehicles according to a modification.

FIG. 9 is a view illustrating a further another modification. FIG. 9 shows a schematic cross-sectional view of the balcony 20 of a collection facility. A parapet 92 of the balcony 20 has an opening 90 with dimensions and a shape, through which the flight vehicle 12 is able to pass and the trash bag 22 is able to pass. The opening 90 is provided with, for example, an openable and closable door and is configured such that the door is opened when an approach of the flight vehicle 12 is detected. When the flight vehicle 12 moves from the balcony space 21 and meets the flight vehicle 13 waiting outside the balcony space 21 (step S514 of FIG. 5), the flight vehicle 12 passes through the opening 90. When the flight vehicles 12, 13 tow and transport the trash bag 22 with the cord-shaped member 23 (step S518 of FIG. 5), the flight vehicles 12, 13 transport the trash bag 22 from the balcony space 21 via the opening 90. When the trash bag 22 is transported by towing the trash bag 22 from above the parapet 92, the trash bag 22 interferes with the parapet 92, and, therefore, friction can be problematic for transport of the trash bag 22 or the trash bag 22 can break. When the trash bag 22 is transported via the opening 90, such an event is able to be avoided.

As described above, with the operation of the transport system 10 according to the present embodiment, it is possible to improve the efficiency of a flight operation with the flight vehicles 12, 13.

In the above-described embodiment, the process and the control program that define the operations of the flight vehicles 12, 13 are stored in the server apparatus 11, and the process and control program may be stored in the storage unit 42 by being downloaded to the flight vehicles 12, 13 via the network 14 or may be stored in a storage and recording medium and stored in the storage unit 42 by the flight vehicles 12, 13 reading the storage and recording medium.

The disclosure is not limited to the above-described embodiment. For example, the plurality of blocks shown in the block diagrams may be integrated or one block may be divided. Instead of executing a plurality of steps described in the flowchart in time sequence in accordance with the description, the steps may be executed in parallel or in different order in accordance with the processing capacity of an apparatus that executes steps or as needed. Modifications are possible without departing from the purport of the disclosure.

What is claimed is:

1. A server apparatus comprising:
a communication unit; and
a control unit configured to send, to a plurality of flight vehicles, an instruction for causing the plurality of flight vehicles to perform a flight operation, wherein the flight operation comprises:
energizing, by a first flight vehicle, a penetration tool toward a target object placed in a predetermined space, holding a first part and a second part of a cord-shaped member attached to the penetration tool, the first part being penetrated through the target object, and the second part not being penetrated through the target object, and flying to outside the predetermined space;
waiting, by a second flight vehicle, outside the predetermined space and receiving any one of the first part and the second part from the first flight vehicle; and
towing, by the first flight vehicle and the second flight vehicle, the target object with the cord-shaped member and transporting the target object to outside the predetermined space by flying while respectively holding any one and the other of the first part and the second part,
wherein when the first flight vehicle is inside the predetermined space, and is unable to ensure enough space to penetrate the penetration tool through the target object, the flight operation further comprises:
towing, by the first flight vehicle, the target object to a predetermined location in the predetermined space by gripping the target object with a gripping mechanism, and energizing the penetration tool toward the target object after towing the target object to the predetermined location.

2. The server apparatus according to claim 1, wherein the predetermined space is a space surrounded by a floor surface and parapet of a balcony and smaller than a space with a size required for the first flight vehicle and the second flight vehicle to fly next to each other.

3. The server apparatus according to claim 2, wherein the first flight vehicle is configured to hold the first part and the second part and fly to outside the predetermined space through an opening provided in the parapet of the balcony.

4. A system comprising:
the server apparatus according to claim 1; and
a plurality of flight vehicles.

5. A non-transitory computer-readable storage medium storing instructions that are executable by a computer and that cause the computer to execute functions of the server apparatus according to claim 1.

6. A first flight vehicle comprising:
a communication unit;
a control unit configured to receive an instruction from a server apparatus via the communication unit;

a holding mechanism configured to hold a penetration tool, wherein the control unit is configured to, under control in accordance with the instruction, execute:

energizing a penetration tool toward a target object placed in a predetermined space, holding a first part and a second part of a cord-shaped member attached to the penetration tool, the first part being penetrated through the target object, the second part not being penetrated through the target object, and flying to outside the predetermined space;

handing over any one of the first part and the second part to a second flight vehicle waiting outside the predetermined space; and towing the target object with the cord-shaped member and transporting the target object to outside the predetermined space by flying together with the second flight vehicle while the first flight vehicle and the second flight vehicle are respectively holding any one and the other of the first part and the second part; and a gripping mechanism configured to tow the target object to a predetermined location in the predetermined space by gripping the target object, wherein when the first flight vehicle is inside the predetermined space, and is unable to ensure enough space to penetrate the penetration tool through the target object, the control unit is further configured to, under the control in accordance with the instruction, execute:

towing, by the first flight vehicle, the target object to the predetermined location in the predetermined space by gripping the target object with the gripping mechanism, and energizing the penetration tool toward the target object after towing the target object to the predetermined location.

7. The first flight vehicle according to claim 6, wherein the first flight vehicle is configured to energize the penetration tool by moving while holding the penetration tool toward the target object.

8. The first flight vehicle according to claim 6, further comprising a launch mechanism configured to launch the penetration tool by energizing the penetration tool toward the target object.

9. The first flight vehicle according to claim 6, wherein the predetermined space is a space surrounded by a floor surface and parapet of a balcony and smaller than a space with a size required for the first flight vehicle and the second flight vehicle to fly next to each other.

10. The first flight vehicle according to claim 9, wherein the first flight vehicle is configured to hold the first part and the second part and fly to outside the predetermined space through an opening provided in the parapet of the balcony.

11. The first flight vehicle according to claim 6, wherein the first flight vehicle is configured to tow the target object put on a placement base provided on a floor surface and including a movement mechanism for moving to the predetermined location.

12. A non-transitory computer-readable storage medium storing instructions that are executable by the control unit of the first flight vehicle according to claim 6, and that cause the control unit to execute functions of the first flight vehicle.

13. An operation method for a system including a server apparatus and a plurality of flight vehicles, the operation method comprising:

sending, by the server apparatus, a flight instruction to a first flight vehicle and a second flight vehicle;

energizing, by the first flight vehicle, a penetration tool toward a target object placed in a predetermined space, holding a first part and a second part of a cord-shaped member attached to the penetration tool, the first part being penetrated through the target object, and the second part not being penetrated through the target object, and flying to outside the predetermined space;

waiting, by the second flight vehicle, outside the predetermined space and receiving any one of the first part and the second part from the first flight vehicle; and towing, by the first flight vehicle and the second flight vehicle, the target object with the cord-shaped member and transporting the target object to outside the predetermined space by flying while respectively holding any one and the other of the first part and the second part, wherein when the first flight vehicle is inside the predetermined space, and is unable to ensure enough space to penetrate the penetration tool through the target object, the method further comprises:

towing, by the first flight vehicle, the target object to a predetermined location in the predetermined space by gripping the target object with a gripping mechanism, and energizing the penetration tool toward the target object after towing the target object to the predetermined location.

14. The operation method according to claim 13, wherein the predetermined space is a space surrounded by a floor surface and parapet of a balcony and smaller than a space with a size required for the first flight vehicle and the second flight vehicle to fly next to each other.

15. The operation method according to claim 14, further comprising holding, by the first flight vehicle, the first part and the second part and flying to outside the predetermined space through an opening provided in the parapet of the balcony.

16. The operation method according to claim 13, further comprising energizing, by the first flight vehicle, the penetration tool by moving while holding the penetration tool toward the target object.

17. The operation method according to claim 13, wherein launching, by the first flight vehicle, the penetration tool toward the target object by energizing the penetration tool with a launch mechanism.

18. The operation method according to claim 13, wherein the first flight vehicle tows the target object put on a placement base including a movement mechanism provided on a floor surface of a balcony and including a movement mechanism for moving to the predetermined location.

19. The server apparatus according to claim 1, wherein, even when first flight vehicle is able to penetrate the penetration tool through the target object, and when the first flight vehicle is inside the predetermined space and is unable to move to the predetermined location, the predetermined location being a location at which the first flight vehicle is able to meet the second flight vehicle, the flight operation further comprises:

towing, by the first flight vehicle, the target object to the predetermined location in the predetermined space by gripping the target object with a gripping mechanism.

20. The server apparatus according to claim 1, wherein the target object is a trash bag.

* * * * *